(12) United States Patent
Fowler

(10) Patent No.: US 8,111,034 B2
(45) Date of Patent: Feb. 7, 2012

(54) SOLAR-POWERED CHARGER WITH HEAT-DISSIPATING SURFACE

(75) Inventor: David Fowler, Dorset (GB)

(73) Assignee: Better Energy Systems, Inc., Oakland, CA (US)

( * ) Notice: Subject to any disclaimer, the term of this patent is extended or adjusted under 35 U.S.C. 154(b) by 295 days.

(21) Appl. No.: 12/188,903

(22) Filed: Aug. 8, 2008

(65) Prior Publication Data

US 2009/0039827 A1  Feb. 12, 2009

Related U.S. Application Data

(60) Provisional application No. 60/954,785, filed on Aug. 8, 2007.

(51) Int. Cl.
*H01M 10/44*   (2006.01)
*H02J 7/00*   (2006.01)
*H01L 25/00*   (2006.01)
*H02N 6/00*   (2006.01)

(52) U.S. Cl. ........ 320/101; 320/107; 320/114; 320/115; 136/243; 136/244; 136/245

(58) Field of Classification Search .................... 320/101
See application file for complete search history.

(56) References Cited

U.S. PATENT DOCUMENTS

| 6,384,314 | B1 * | 5/2002 | Lund-Hansen | 136/246 |
|---|---|---|---|---|
| 7,723,954 | B2 * | 5/2010 | Frucht | 320/117 |
| 2004/0069341 | A1 * | 4/2004 | Heidrich | 136/244 |
| 2008/0007212 | A1 * | 1/2008 | Theytaz et al. | 320/107 |
| 2009/0007958 | A1 * | 1/2009 | Ho et al. | 136/245 |

FOREIGN PATENT DOCUMENTS

| DE | 10127292 A1 * | 12/2002 |
|---|---|---|
| KR | 20-0357241 Y1 | 7/2004 |
| KR | 20-0374787 Y1 | 1/2005 |
| KR | 10-2005-0077666 | 8/2005 |
| KR | 10-0554362 B1 | 2/2006 |

OTHER PUBLICATIONS

International Search Report and the Written Opinion of the International Searching Authority for PCT/US2008/072648 dated Feb. 25, 2009.

* cited by examiner

*Primary Examiner* — Edward Tso
*Assistant Examiner* — Ahmed Omar
(74) *Attorney, Agent, or Firm* — Foley & Lardner LLP

(57) ABSTRACT

A solar-powered charger includes a solar collector configured to generate electrical energy when exposed to light, a connector coupled to the solar collector to provide a pathway for discharging the electrical energy to an external device and a casing comprising a surface configured to dissipate heat.

12 Claims, 3 Drawing Sheets

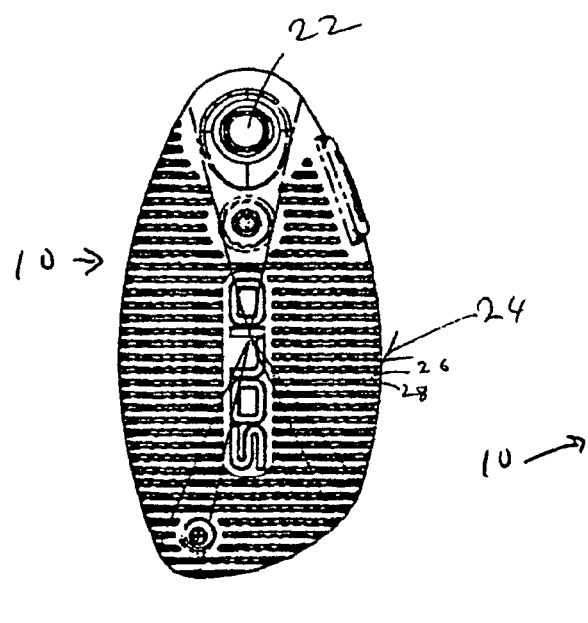
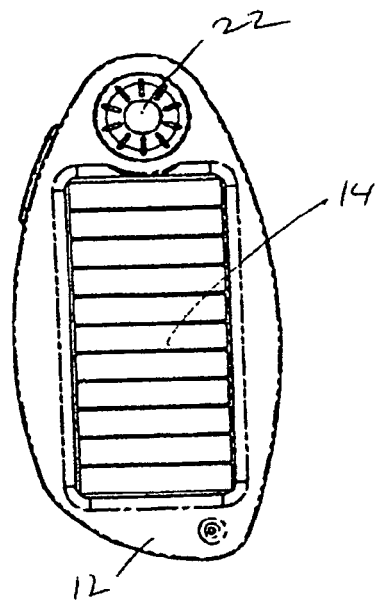
Fig. 5  Fig. 6
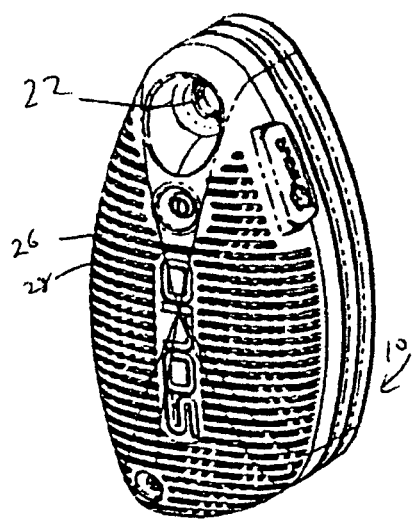
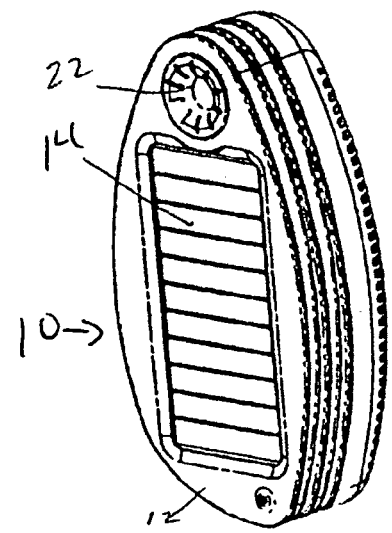
Fig. 7  Fig. 8

SOLAR-POWERED CHARGER WITH HEAT-DISSIPATING SURFACE

This application claims the benefit of the filing date of U.S. Provisional Patent Application No. 60/954,785, filed on Aug. 8, 2007, which is incorporated herein by reference in its entirety.

BACKGROUND

Solar powered chargers conveniently provide power in any location. Locations where solar powered chargers are particularly useful include rural and mountainous locations distant from existing power distribution points. Persons wishing power for lighting, communication, or portable electronic equipment while hiking, camping or traveling to remote destinations will find solar powered chargers useful. However, solar powered chargers are often not suited to the conditions of travel or transportation. Even within an urban area, there it may be difficult to use or protect a solar powered charger during travel or transport, as the charger may not be able to be exposed to the sun during those periods. Accordingly, there is need in the art for solar powered chargers suitable for use while hiking, camping, traveling, or even walking about town.

SUMMARY

A solar powered charger according to one aspect of the invention includes a solar collector element configured to provide electrical power when exposed to light, such as sunlight, artificial light, or other light; a connector element providing a pathway for electrical energy generated by the solar collector to be discharged; and a casing having a surface configured for dissipation of heat. In some embodiments, the heat dissipating surface is an integral part of the casing, and may include ridges, vanes, fins, bumps, slots, or other elements providing increased surface area effective to provide greater and/or more efficient heat transfer to the surrounding environment. In some embodiments, the solar collector element comprises more than one solar collector. In preferred embodiments having a plurality of solar collector elements, the solar collector elements are configured to be deployed in an open configuration, in which the solar collectors are disposed so as to minimize overlap of one collector over another collector, while being configured to be disposed in other configurations in which at least a portion of a collector may overlap or be placed over or in front of at least a portion of another collector. In some embodiments, a plurality of solar collector elements may be configured in a closed configuration in which the solar collector elements may be disposed so as to overlap and to take up less space than in an open configuration.

A heat-dissipating surface may provide the advantage of allowing greater current flow, or greater rate of discharge, of electrical power produced or stored by a solar powered charger according to one embodiment of the invention as compared to the current flow, or rate of discharge, commonly obtainable in the absence of such a heat-dissipating surface. A heat-dissipating surface may provide the advantage of allowing a solar powered charger to remain in direct sunlight for a longer time than would otherwise be practical in the absence of such a heat-dissipating surface. A heat-dissipating surface may provide the advantage of allowing a solar powered charger to remain in direct sunlight for charging while maintaining a lower temperature than would otherwise be practical or possible in the absence of such a heat-dissipating surface. Maintaining a lower temperature may provide the advantage of greater efficiency of power production and may provide the advantage of lower energy loss from a battery, or greater service life of a battery or of a solar collector element.

In some embodiments of the invention, a connector element is adaptable to mate with a plurality of complementary connectors, so that, for example, electrically powered devices from a plurality of manufacturers or devices of different designs and functions may be connected to the solar powered charger. A connector may be attached to, or may include, a wire or cable element, preferably a flexible wire or cable, allowing ease of connection to other connectors, cables, or devices. In embodiments, a wire or cable element is waterproof. A solar powered charger according to one embodiment of the invention may include a battery or other electrical storage element configured to retain and store electrical energy for discharge at a later time. A solar powered charger according to one embodiment of the invention is preferably housed in a sturdy casing providing support for the solar collector element while allowing ready exposure of the solar collector element to light. In some embodiments, a solar collector may be covered with a transparent or translucent cover or coating to provide additional protection and strength.

A solar powered charger with a heat-dissipating surface according to one embodiment of the invention provides portable and flexible electrical power suitable for powering lights, global positioning service (GPS) devices, radios, telephones, computers, personal assistant devices, electronic music players, and other personal, portable, or other electronic devices in any location.

BRIEF DESCRIPTION OF THE FIGURES

FIG. 5 is a view of a solar-powered charger solar-powered charger according to one embodiment of the invention in a closed configuration, providing a view of a heat-dissipating surface.

FIG. 6 is a view of a solar-powered charger according to one embodiment of the invention in a closed configuration, showing a solar collector.

FIG. 7 is a perspective view of a solar-powered charger according to one embodiment of the invention, showing portions of the bottom and side in a closed configuration, and illustrating that the solar panels are able to fold and to line up one behind another, and further providing a view of a heat-dissipating surface.

FIG. 8 is a perspective view of a solar-powered charger according to one embodiment of the invention, showing portions of the top and side of a solar-powered charger in a closed configuration, also illustrating how the solar panels are able to fold and to line up one behind another, and further providing a view of a solar collector element.

DETAILED DESCRIPTION

Figure 1:
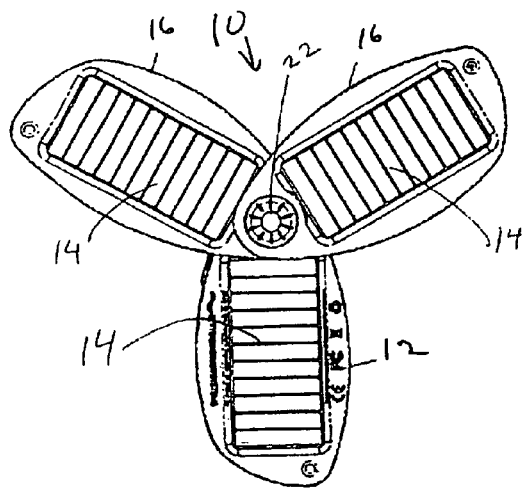
FIG. 1 illustrates a solar-powered charger according to one embodiment of the invention shown in an open configuration.

In the following description, numerous specific details are set forth such as examples of specific materials, methods, components, etc. in order to provide a thorough understanding of the present invention. It will be apparent, however, to one skilled in the art that these specific details need not be employed to practice the present invention. In other instances, well-known materials or methods have not been described in detail in order to avoid unnecessarily obscuring the present invention.

A solar powered charger according to one embodiment of the invention may include a solar collector or other element that produces electrical power upon exposure to light, such as sunlight. In preferred embodiments, the solar powered charger includes more than one solar panel or solar collector. For example, a solar powered charger according to one embodiment of the invention may have one, two, three, four, five, six, or more solar collector elements, preferably housed in or on separate collector panels or in or on a charger case or housing. In preferred embodiments, a solar powered charger has separate solar panels, one or more of the solar panels being movable with respect to the other panel(s), so as to allow deployment of the panels in an open configuration to allow exposure of most or all collector surfaces without blockage of light by another panel. Such movable panels may also be disposed in a closed configuration so as to fold up into a reduced volume configuration for ease of storage and transport, and to provide a sturdier configuration as compared to an open configuration. A solar collector element may have a power output of about 0.1 Watts to about 5 Watts, or may have a power output of between about 0.5 Watts and about 1 Watt, or may provide other amounts of power. In a particular embodiment, each solar collector may provide up to about 0.6 Watts of power.

It will be understood that the term "solar charger" or other reference to "solar" indicates an element that, when exposed to light of any kind and from any source, including but not limited to sunlight, provides electrical energy. An element that provides electrical power upon exposure to light may be termed a photoelectric element. Suitable photoelectric elements include selenium metal photoelectric elements, silicon semiconductor photoelectric elements, amorphous silicon photoelectric elements, amorphous-microcrystalline silicon stacked photoelectric elements, crystalline silicon photoelectric elements, polycrystalline silicon photoelectric elements, copper indium selenide photoelectric elements, compound semiconductor photoelectric elements, and the like.

A solar powered charger having an open and a closed configuration may include a boss which serves as a hinge around which the solar panels may rotate from a closed configuration into an open configuration, or vice versa. Thus, in embodiments, solar panels may fan out from a closed configuration to an open configuration for greater exposure to light. A boss may include elements, such as channels, pass-throughs, attachments, or other elements, which guide or protect wires and other electrical conducting elements which connect the solar collector elements located on or in the solar panels with other elements located in a charger body or in another panel. A boss according to one embodiment of the invention may include a bore or gap which may accept a rod, beam, mandrel, or other element upon which the solar powered charger may be mounted, suspended or attached.

A solar powered charger according to one embodiment of the invention may include one or more rechargeable batteries configured to collect and store the electrical power output by the collector. Any suitable rechargeable battery may be used, including nickel-cadmium, lithium ion, and other batteries, and any suitable combination of batteries may be used. For example, a rechargeable lithium battery may be used. In embodiments, a suitable rechargeable lithium battery may be rated at 3.7 V and 1000 mAh (milliamp hours). A rechargeable battery may be recharged by the photoelectric elements, or by an external power source. External power sources may be connected by any suitable means, including USB connectors, jacks of any suitable configuration, or other connector.

The efficiency of battery charging, discharging, and energy storage may be affected by temperature. For example, the typical charging temperature range for a lithium-ion battery is about 0° to about 45° C. (about 32° to about 113° F.), and the typical lithium-ion battery discharge temperatures rage from about 20° to about 50° C. (about 68° to about 122° F.). Heat-dissipating surfaces as disclosed herein are effective to aid in keeping batteries and solar chargers having such batteries within desired temperature ranges, improving performance and aiding maximization of energy accumulation, storage and discharge. Solar cells may also be affected by temperature, and typically work best within the range of about 0° to about 90° C. (about 32° to about 194° F.); however, solar cells are known to work at temperatures as low as minus 50° C., for example. Heat-dissipating surfaces as disclosed herein are effective to aid in keeping solar cells and solar collectors at temperatures suited for best performance, such as, for example, below about 50° C. (122° F.).

The collector output and battery output may be configured in parallel, may be configured in series, and may be configured in an adjustable manner in which a switch or other element determines the source of output power (whether directly from the solar collector, directly from the battery, or from both). Diodes, switches, or other elements may be included in the output circuit to insure proper power output.

In preferred embodiments, a connector is in electrical contact with the power output element (including the solar collector or other photoelectric element, battery, and control circuitry), includes a flexible cable, and is configured to accept a plurality of connector ends so as to mate with various types of external equipment to power that external equipment.

External equipment which may be powered by a solar powered charger according to one embodiment of the invention include game devices, including game consoles; GPS devices, lights, including flashlights and lamps, including headlamps (e.g., lights that may be worn on the head or attached to a hat or headband); music players (e.g., MP3 players, iPod® devices, etc.); headphones; telephones; cameras; personal data assistant (PDA) devices; mobile messaging devices; computers; clocks; and other devices. Connectors include USB connectors, microphone jacks, connectors for devices from a variety of different manufacturers or models (e.g., Nokia; Motorola; Samsung; Sony Ericksson; Blackberry; etc.).

A heat-dissipating surface may be part of, or be attached to, a case for a solar powered charger according to one embodiment of the invention. In embodiments, a heat dissipating surface may be part of, or be attached to, a panel having a solar collector. In embodiments, both a case and a panel include a heat-dissipating surface. A heat-dissipating surface may have fins, vanes, bumps, plates, ridges, valleys, or other surface protrusions, depressions, or other elements configured to transfer heat from the solar powered charger to the environment by radiative and/or convective and or conductive heat transfer. Such surface elements may be integral to the surface, or may be attached to the surface, or may include a combination of integral and attached features effective to transfer heat from the solar powered charger to the environment.

A case according to one embodiment of the invention may be made of metal, plastic, composite, polymer, or other suitable material. Suitable materials include, for example, metal, such as, for example, magnesium, aluminum, steel (including stainless steel), and other metals; plastic; ceramic; polymers, such as polycarbonate, polyurethane, polyethylene, polyvinyl chloride, and other polymers and polymer blends; graphite fiber and graphite fiber composites; fiberglass; hybrid materials including metal fibers and plastic or polymer; and other materials. For example, a case may be made from polycarbonate.

A solar powered charger according to one embodiment of the invention having a photoelectric element may include a photoelectric element encapsulated in plastic, polymer, ceramic, or other material, such as, e.g., polycarbonate, to provide a photoelectric element molded into a casing to provide a fully encapsulated, waterproof and/or gas impermeable, device with integrated photoelectric element.

As shown in FIG. 1, solar-powered charger 10 according to one embodiment of the invention has a body 12 having a solar collector 14 and two panels 16 having solar collectors 14. The solar powered charger 10 is shown in an open configuration. A solar-powered charger 10 may have a boss 22 around which the solar panels 16 can rotate with respect to each other and with respect to the body 12. A solar powered charger 10 may include or work with a cable and/or a connector.

Figure 2:
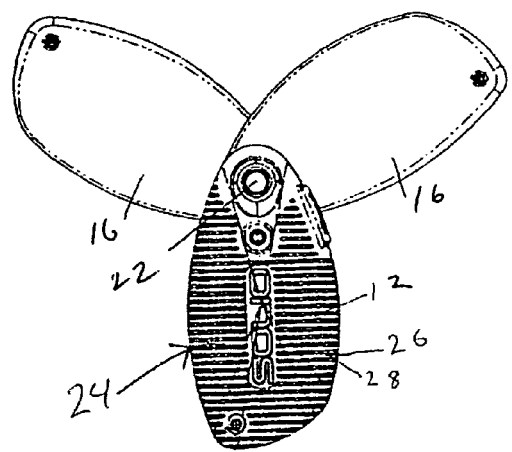
FIG. 2 illustrates a solar-powered charger according to one embodiment of the invention in an open configuration, showing a heat dissipating surface on a portion of the charger.

FIG. 2 shows a solar-powered charger according to one embodiment of the invention in an open configuration, showing a heat dissipating surface on a portion of the charger. As shown in FIG. 2, solar-powered charger 10 according to one embodiment of the invention has a body 12 having heat-dissipating surface 24 including ridges 26 and depressions 28. As shown in the figures, the ridges and depressions form a regular pattern, and have relatively uniform height (for ridges) and depth (for depressions). It will be understood that in other embodiments, ridges and depressions may vary in height and depth, so that some ridges may have different heights than other ridges and some depressions may have different depths than other depressions. The widths of the ridges and of the depressions are also relatively uniform in the examples shown in the figures; it will be understood that in other embodiments, ridges and depressions may vary in their widths as well.

Figure 3:
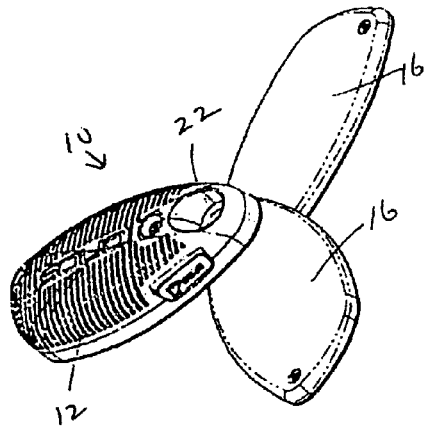
FIG. 3 is a perspective view of a solar-powered charger according to one embodiment of the invention in an open configuration, showing portions of the bottom and side of the solar-powered charger and a view of a heat-dissipating surface.
Figure 4:
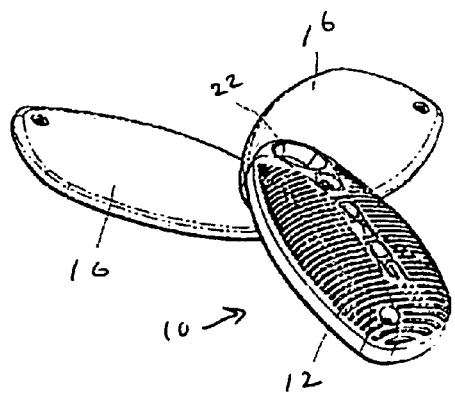
FIG. 4 is an additional perspective view of the solar-powered charger according to one embodiment of the invention, showing portions of the bottom and side of the solar-powered charger in an open configuration.

FIGS. 3 and 4 are perspective views of a solar-powered charger 10 according to one embodiment of the invention in an open configuration, showing portions of the bottom and sides of the solar-powered charger 10 in an open configuration, including perspective views of a heat-dissipating surface 24 and of the bottoms of the panels 16.

FIGS. 5 and 7 are views of a solar-powered charger 10 according to one embodiment of the invention in a closed configuration, providing views of a heat-dissipating surface 24 and of the connector 18 and boss 22. These figures illustrate that solar panels 16 are able to rotate around boss 22 and line up one behind another in the closed configuration, providing a smaller aspect suitable for storage, transport, and providing protection for the panel 16. A solar powered charger 10 according to one embodiment of the invention may still be exposed to light, such as sunlight, and still generate power in a closed configuration if desired, so long as one solar collector 14 is exposed to light.

FIGS. 6 and 8 are views of a solar-powered charger according to one embodiment of the invention in a closed configuration, showing a solar collector 14.

Figures 9, 10:
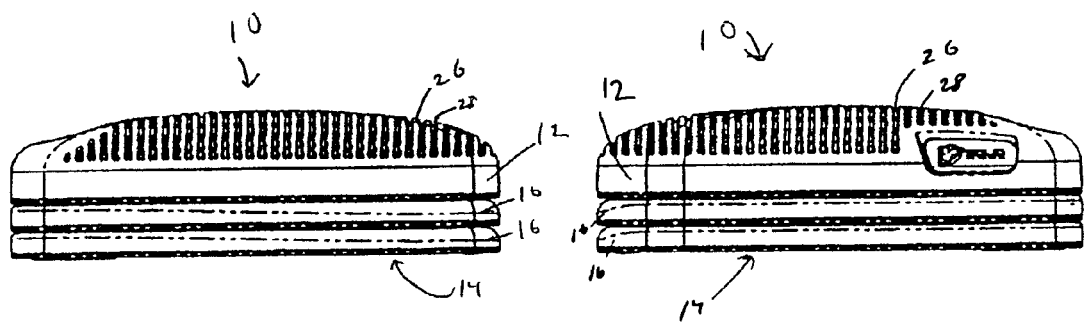
FIG. 9 is a side elevation view showing portions of the bottom and side of a solar-powered charger in one embodiment in a closed configuration, and showing how the solar panels are able to fold and to line up one behind another.
FIG. 10 is a side elevation view showing portions of the bottom and side of a solar-powered charger in one embodiment in a closed configuration, and showing how the solar panels are able to fold and to line up one behind another.

FIGS. 9 and 10 are side views showing portions of the bottom and side of a solar-powered charger 10 in a closed configuration, and providing another example of how the solar panels 16 are able to fold and to line up one behind another.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A solar-powered charger, comprising:
    a plurality of solar collectors configured to generate electrical energy when exposed to light, the solar collectors being encapsulated in a waterproof material and arranged in a stacked configuration and coupled to one another at a boss to provide a hinge about which the solar collectors can fan out for deployment between a minimum overlap position and a maximum overlap position;
    a bore disposed at least partially through the boss and substantially perpendicular to the solar collectors, the bore configured to accept a rod member useable for supporting the solar collectors upon a surface facing the light and for verifying an orientation of the solar collectors toward the light;
    a connector coupled to the solar collector to provide a pathway for discharging the electrical energy to an external device; and
    a casing comprising a surface configured to dissipate heat, the surface including a plurality of alternating ridges and depressions;
    wherein each of the encapsulated solar collectors includes a heat dissipating surface having a plurality of alternating ridges and depressions that are arranged to substantially align with one another when the encapsulated solar collectors are in the maximum overlap position of the stacked configuration.

2. The solar-powered charger of claim 1, further comprising a battery coupled to the solar collector configured to receive and store the electrical energy.

3. The solar-powered charger of claim 1, wherein the minimum overlap position maximizes an exposed surface area of the plurality of solar collectors.

4. The solar-powered charger of claim 1, wherein the maximum overlap position minimizes a footprint of the solar powered charger.

5. The solar-powered charger of claim 1, wherein the boss provides an electrical connection between the plurality of solar collectors.

6. The solar-powered charger of claim 1, wherein the casing comprises one of a metal casing, a ceramic casing, a plastic casing and a composite casing.

7. The solar-powered charger of claim 6, wherein the metal casing comprises one of a magnesium casing, an aluminum casing, a steel casing and a stainless steel casing.

8. The solar-powered charger of claim 6, wherein the plastic casing comprises one of a polycarbonate casing, a polyurethane casing, a polyethylene casing, a polyvinyl chloride casing and polymer blends.

9. The solar-powered charger of claim 6, wherein the composite casing comprises one of a graphite fiber composite casing, a fiberglass casing and a composite metal and plastic casing.

10. The solar-powered charger of claim 2, wherein the battery comprises one of a nickel-cadmium rechargeable battery and a lithium-ion rechargeable battery.

11. The solar-powered charger of claim 1, wherein the solar collector comprises one of a selenium metal photoelectric element, a silicon semiconductor photoelectric element, an amorphous silicon photoelectric element, an amorphous-microcrystalline silicon stacked photoelectric element, a crystalline silicon photoelectric element, a polycrystalline silicon photoelectric element, a copper indium selenide photoelectric element and a compound semiconductor photoelectric element.

12. The solar-powered charger of claim 1, wherein the solar collector is encapsulated in one of a transparent plastic material, a transparent polymer material and a transparent ceramic material to render the solar collector waterproof and gas-impermeable.

* * * * *